C. MILLER.
GATE.
APPLICATION FILED MAR. 15, 1915.
1,153,560. Patented Sept. 14, 1915.
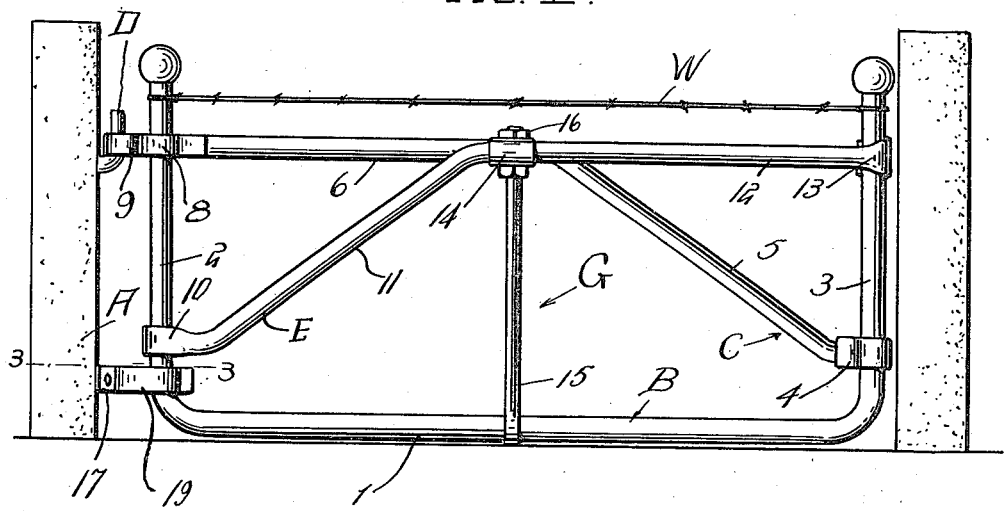
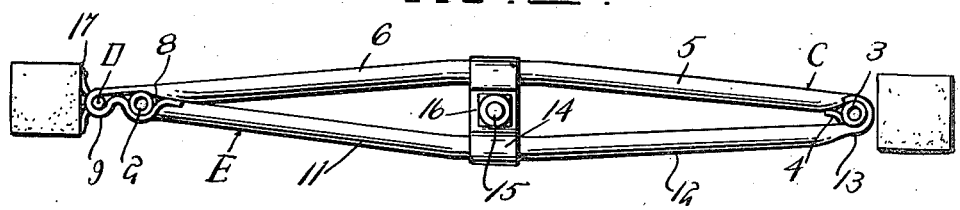
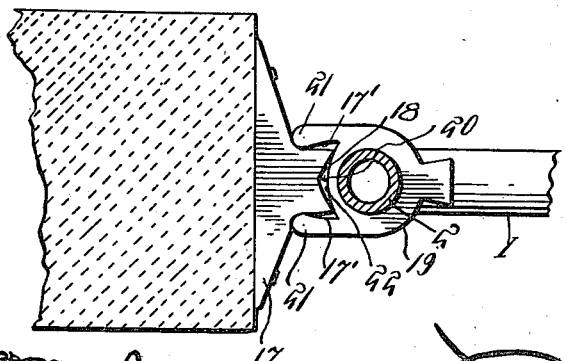
Inventor
C. Miller.

UNITED STATES PATENT OFFICE.

CALVIN MILLER, OF BLUFFTON, OHIO.

GATE.

1,153,560.

Specification of Letters Patent. Patented Sept. 14, 1915.

Application filed March 15, 1915. Serial No. 14,492.

*To all whom it may concern:*

Be it known that I, CALVIN MILLER, a citizen of the United States, residing at Bluffton, in the county of Allen, State of Ohio, have invented certain new and useful Improvements in Gates; and I do hereby declare the following to be a full, clear, and exact description of the invention, such as will enable others skilled in the art to which it appertains to make and use the same.

This invention relates to certain novel and useful improvements in gates, and has particular application to a farm gate adapted to be employed in connection with wire fences, although I wish it to be understood that it is not limited in its useful application to this particular type of fence.

In the present instance it is my purpose to provide a gate formed of a skeleton frame of metallic tubing or metallic bars, which are so assembled that although the entire gate is made up of relatively few tubes or bars, it will present an exceedingly strong, durable structure.

Still a further object of my invention is the provision of a gate of this character having two tubes or bars, one of which forms a combined diagonal brace, top bar and hinge for the gate, while the other bar forms both a diagonal brace and a top bar for the gate, these two bars being connected together where they extend in parallelism at the top central portion of the gate, a vertical brace rod being further provided which extends from the bottom bar of the gate to the connection between the two bars aforesaid.

It is also my purpose to form the vertical end bars and bottom bar or portion of the gate of a single piece of metal.

Furthermore, I propose to provide a loose lower hinge for the gate which is so constructed that when the gate is open, the forward or free end of the gate will be lifted or elevated from the ground.

With the above recited objects and others of a similar nature in view, my invention consists in the construction, combination and arrangement of parts set forth in and falling within the scope of the appended claim.

In the accompanying drawings: Figure 1 is a view in side elevation of a gate embodying my invention. Fig. 2 is a top plan view thereof. Fig. 3 is a horizontal sectional view taken on the line 3—3 of Fig. 1.

Referring now to the accompanying drawings in detail, the letter A designates a hinged post, while my improved gate is indicated as an entirety by the letter G. This gate comprises a section of pipe tubing or metal bar B, which is bent into approximately U-shaped form to constitute the bottom horizontal bar 1 and the vertical end bars 2 and 3. The letter C designates a metal tube or rod, one end of which is formed with a loop or eye 4 adapted to fit around the lower part of the end bar 3, this bar C extending diagonally upward and inward toward the center of the gate for about half its length to provide the diagonal brace 5 and is then extended horizontally as at 6 to and beyond the opposite side bar 2 of the gate, the end of the horizontal section of this bar C being flattened and looped to provide an eye 8 through which the top portion of the bar 2 passes, and a hinge sleeve 9 adapted to fit over the hinge stud D adjacent the top of the post A. A second tube or bar E is also provided, one end of which is formed with a loop or eye 10 adapted to fit around the lower portion of the vertical bar 2 of the gate frame, this bar being bent diagonally upward and inward toward the center of the gate to form the diagonal brace section 11 which extends opposite to the diagonal brace section 5, this brace bar E being then extended horizontally, as at 12 with the free end of the horizontal section rolled or bent to form the loop or eye 13 which fits around the top portion of the side bar 3.

It will be noted that the horizontal sections 6 and 12 of the tubes or bars C and E form the top horizontal member of the gate, and at the central portion of the gate these rods extend in parallelism but are spaced apart. The flat metallic strap or loop 14 spans and connects the two rods at the center of the top of the gate, and a central vertical brace rod 15 is connected at its upper end as at 16 to the strap and at its lower end is coiled about the bottom bar 1 of the gate. Bolted to the hinged post A adjacent the bottom thereof is a hinge block 17 which is formed with a concaved recess 18 at its free forward end. This block is preferably formed of metal. Carried by the vertical bar 2 of the gate adjacent the bottom bar is a companion hinge member 19 comprising a block bored in the usual manner to receive the vertical bar 3, this hinge member 19 being recessed as at 20 so that two spaced lugs 21 are formed, the bottom wall 22 of the recess being curved outwardly or convexed, this bar being adapted to fit into the concaved recess 18 of the block 17, while the lugs 21—21 lie at the sides 17' of the block 17. Thus it will be noted that the lower hinge of the gate is formed of two loose members, and that when the gate is swung open in one direction, one of the lugs 21 of the hinge member 19 will bear against the adjacent face 17' of the hinge member 17, while the opposite lug 21 will be moved away from the adjacent side face or wall 17'. In other words, the hinge member 19 will rock on the hinge member 17, and as the gate is swung open the tendency will be to elevate the front portion of the gate from the ground. If desired any suitable bolts may be employed for connecting the loops or eyes at the ends of the bars to adjacent parts of the gate. Furthermore, a horizontal strand or wire W may be strung across the top of the gate as shown in Fig. 1.

From the above description, taken in connection with the accompanying drawings, it will be seen that I provide a simple, strong gate, constructed entirely of metal, and wherein but very few bars or sections are employed, and furthermore, it will be seen that the construction of my gate is such that it may be manufactured and marketed at a relatively low cost.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claim.

What I claim is:

A gate comprising a substantially U-shaped section constituting the horizontal bottom bar and the end bars of the gate, two members connected at their ends to the end bars of the gate and constituting diagonal brace sections and top bar sections for the gate, a connection between the top bar sections, a brace member extending between said connection and the bottom bar section of the gate, and hinge members for the gate.

In testimony whereof, I affix my signature, in the presence of two witnesses.

CALVIN MILLER.

Witnesses:
W. B. MOORE,
HENRY L. ROMEY.